(12) United States Patent
Schley-May

(10) Patent No.: US 6,792,104 B2
(45) Date of Patent: Sep. 14, 2004

(54) TRANSFORMER-COUPLED MATCHING IMPEDANCE

(75) Inventor: James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 10/278,927

(22) Filed: Oct. 22, 2002

(65) Prior Publication Data

US 2003/0081761 A1 May 1, 2003

Related U.S. Application Data

(60) Provisional application No. 60/336,283, filed on Oct. 25, 2001.

(51) Int. Cl.$^7$ ................................................ H04M 1/58
(52) U.S. Cl. ........................................ 379/391; 379/403
(58) Field of Search .............................. 379/391, 392, 379/402, 403, 404

(56) References Cited

U.S. PATENT DOCUMENTS

| | | | |
|---|---|---|---|
| 3,586,881 A | | 6/1971 | Gaunt, Jr. |
| 3,617,645 A | * | 11/1971 | Gumley ...................... 379/402 |
| 4,103,118 A | | 7/1978 | Bergman |
| 4,380,690 A | * | 4/1983 | Matsufuji et al. ........... 379/402 |
| 5,712,977 A | | 1/1998 | Glad et al. |
| 5,901,210 A | | 5/1999 | Schley-May |
| 6,163,579 A | | 12/2000 | Harrington et al. |
| 6,169,792 B1 | | 1/2001 | Schley-May |
| 6,172,992 B1 | | 1/2001 | Hoffmann |
| 6,400,772 B1 | | 6/2002 | Chaplik |

OTHER PUBLICATIONS

PCT Search Report, PCT/US02/33967, International filing date Oct. 22, 2002.
PCT Notification of Transmittal of International Preliminary Examination Report (IPER), mailed Jan. 7, 2004, p. 1 total.

* cited by examiner

Primary Examiner—Minsun Oh Harvey
Assistant Examiner—Daniel Swerdlow
(74) Attorney, Agent, or Firm—Blakely, Sokoloff, Taylor & Zafman LLP

(57) ABSTRACT

A system for matching impedance in the circuitry of an xDSL communication device to improve noise cancellation resulting from signal leakage between transmit and receive signals. The system for matching impedance includes a transformer configured to couple an impedance, which is substantially equal to a line impedance, to a line coupling transformer, and is applicable to all known hybrid topologies. The transformer is ideally as closely matched to the line coupling transformer as possible. This technique allows greatly improved impedance matching in the hybrid, which directly benefits the performance of xDSL communication devices.

19 Claims, 5 Drawing Sheets

TRANSFORMER-COUPLED MATCHING IMPEDANCE

CROSS-REFERENCE TO A RELATED APPLICATION

This application is related to, and claims the benefit of, U.S. Provisional Patent Application No. 60/336,283, entitled "Transformer-Coupled Matching Impedance," filed on Oct. 25, 2001. The subject matter of the related application is hereby incorporated by reference.

BACKGROUND OF THE INVENTION

1. Field of the Invention

This invention relates generally to the field of xDSL (x Digital Subscriber Line) line interface circuitry, and more particularly to hybrid circuitry known as 2-to-4 wire converters.

2. Description of the Background Art

Typically, xDSL modems separate transmit and receive signals to cancel noise. However, when the transmit signal (one band) leaks into the receive signal (another band), the noise degrades xDSL performance. Thus, xDSL modems often use filters to prevent this leakage between bands. However, the filters cannot be efficiently sharpened to optimally cancel noise.

Instead of filters, hybrids (2-to-4 wire converters) are used to cancel noise in xDSL line interface circuitry. However, hybrids typically cannot achieve enough noise cancellation because it is difficult to construct a circuit of resistors, capacitors, and inductors with a total impedance that closely matches the transmission line characteristic impedance. It is relatively easy to match impedances at a single specific frequency, but maintaining an impedance match over a range of frequencies is difficult.

Further, noise cancellation is difficult to achieve with a hybrid because the transmission line can only be "seen" through a mandatory line-coupled transformer. The transformer has less than ideal properties that alter the perception of the line impedance. The most significant properties are the magnetizing and leakage inductances, which significantly degrade noise cancellation. In practice, it is not practical to produce transformers with sufficiently small leakage inductance or sufficiently large magnetizing inductance to achieve acceptable noise cancellation.

One method to improve noise cancellation is to use inductors to incorporate compensating inductances into the impedance of the hybrid. However, this method is limited by the problem of accurately matching the discreet inductor values to the inductance values intrinsic in the transformer. The inductance values intrinsic in the transformer cannot be precisely controlled and incorporating inductors does not yield optimum hybrid performance.

Therefore, what is needed is a technique that permits xDSL line interface circuitry in a communication system to cancel noise between transmit and receive signals while matching impedance on the xDSL line interface circuitry.

SUMMARY OF THE INVENTION

A system for matching impedance in the circuitry of an xDSL communication device to improve noise cancellation resulting from signal leakage between transmit and receive signals. In one embodiment, a line interface circuit includes a transformer configured to couple a matching impedance, which is substantially equal to a line impedance, to a line coupling transformer, and is applicable to all known hybrid topologies. The transformer is ideally as closely matched to the line coupling transformer as possible. This technique allows greatly improved impedance matching in the hybrid, which directly benefits the performance of xDSL communication devices.

The line coupling transformer and the other transformer are substantially identical, having substantially identical leakage inductances and substantially identical magnetizing inductances. Substantially identical transformers can be achieved using an identical manufacturing process at a single manufacturing facility. In one embodiment, the matching impedance is a complex impedance network configured to have an impedance substantially equal to the line impedance.

DETAILED DESCRIPTION OF THE INVENTION

Figure 1:
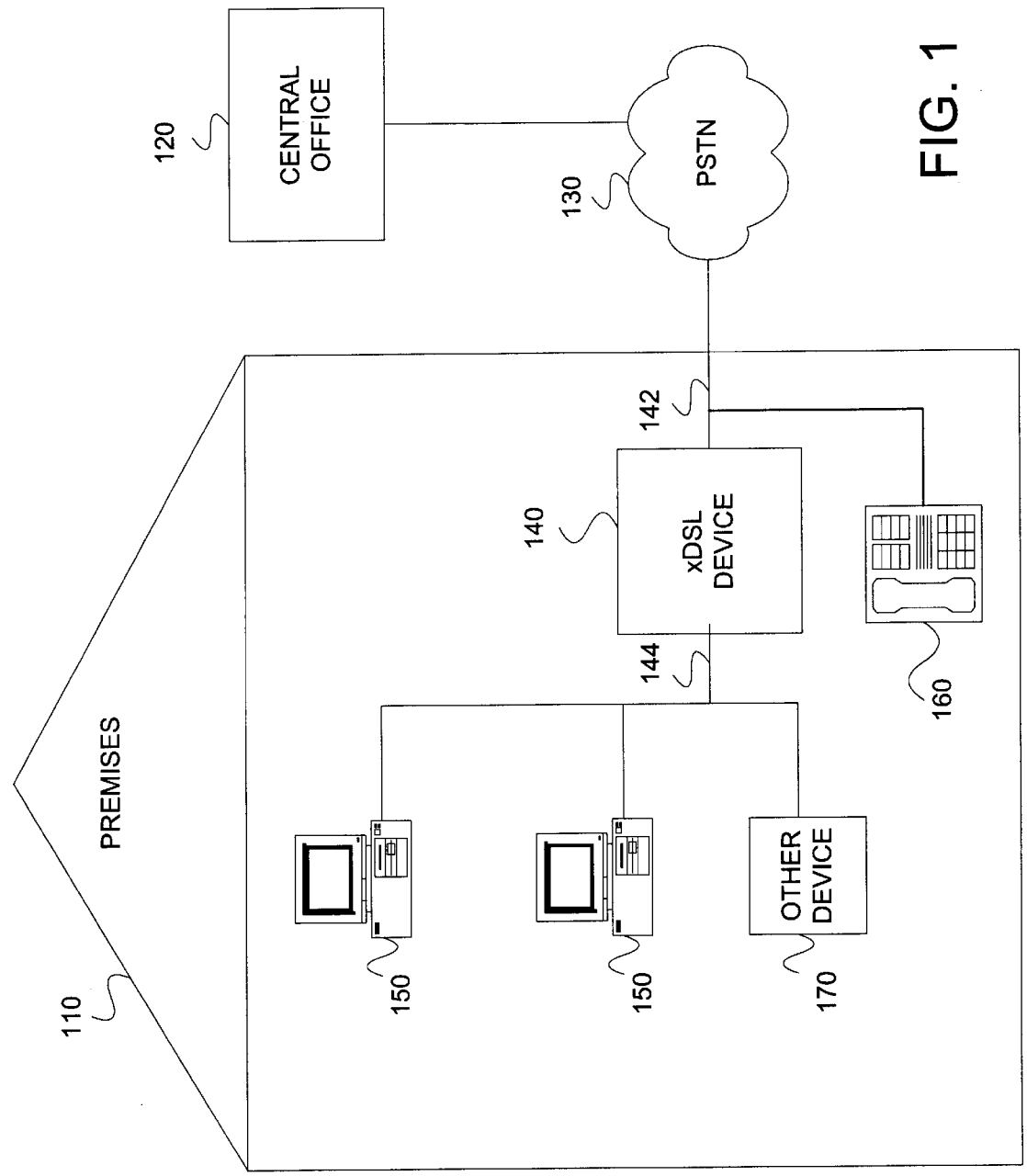
FIG. 1 is a diagram of one embodiment of a communication system in accordance with the invention.

FIG. 1 is a diagram of one embodiment of a communication system in accordance with the invention. A premises 110, including property with any type of structure, is coupled via a line 142 to a PSTN (Public Switched Telephone Network) 130 that provides copper wires as a telecommunications medium and can also include Cat 5 copper cables (not shown) and fiber optic cables (not shown). PSTN 130 is further coupled to a central office 120 that provides telecommunication services for a particular area. Central office 120, operated by a service provider (not shown), provides switching technology for Plain Old Telephone Service (POTS), Integrated Services Digital Network (ISDN) service, and xDSL service.

In premises 110, an xDSL device 140, such as a DSL modem or router, communicates via line 142 with PSTN 130 and via a path 144 with multiple telecommunication devices. The telecommunication devices include, but are not limited to, computers 150 with network/telecommunication hardware and software (not shown) and other devices 170, such as set-top boxes, home network gateways, PDAs (Personal Digital Assistants), and printers. A telephone 160 is coupled to line 142 and includes a low pass filter (not shown) for filtering out non-POTS band signals. Other POTS devices, such as a facsimile machine, may also be coupled to line 142.

Figure 2:
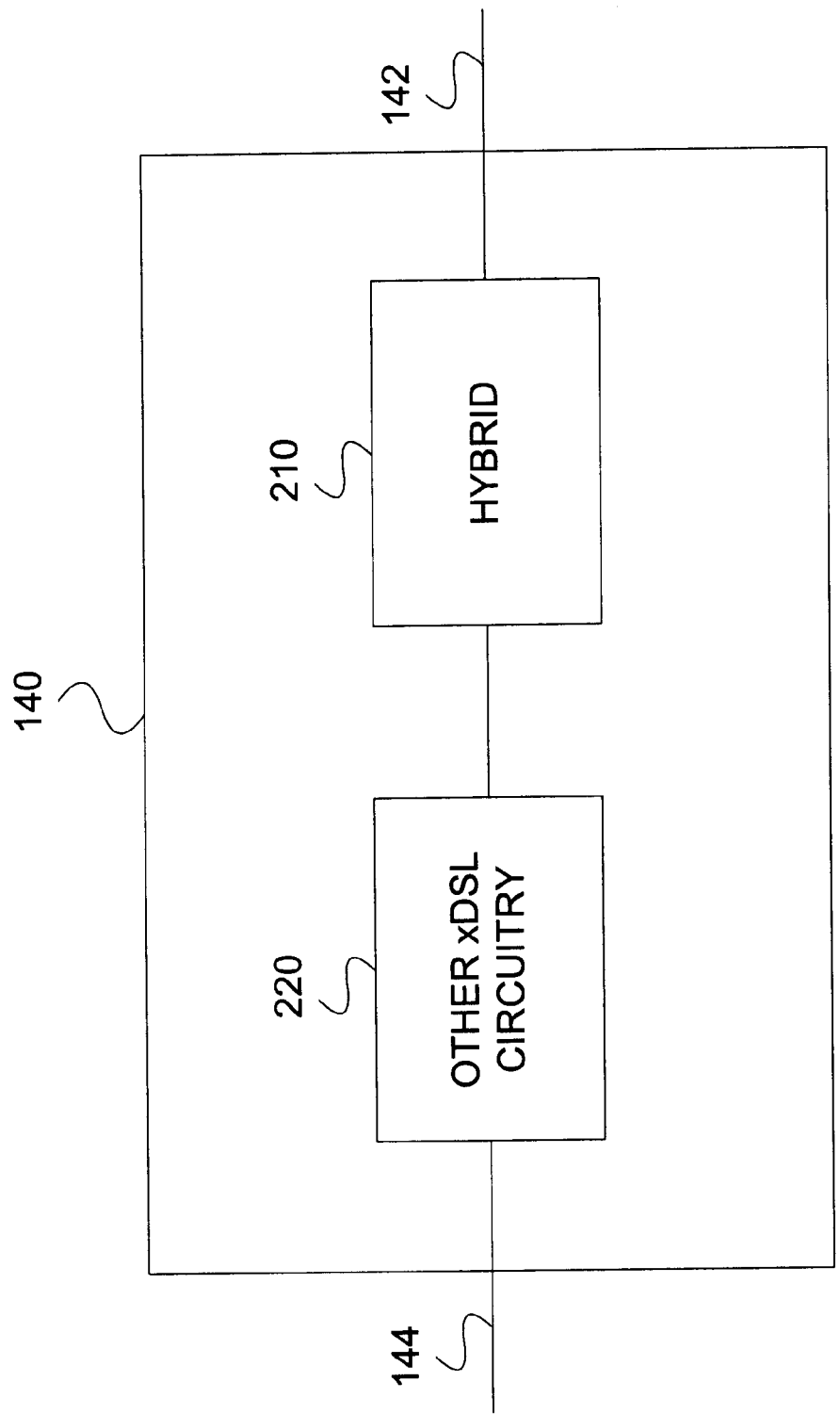
FIG. 2 is a diagram of one embodiment of an xDSL device in accordance with the invention.

FIG. 2 is a diagram of one embodiment of xDSL device 140 of FIG. 1 in accordance with the invention. xDSL device 140 includes, but is not limited to, a hybrid 210 and other xDSL circuitry 220. Hybrid 210 is a 2-to-4 wire converter that electromagnetically couples xDSL device 140 to line 142. Other xDSL circuitry 220, which includes filters and a transceiver, communicates via path 144 with computers 150 and other device 170.

Figure 3:
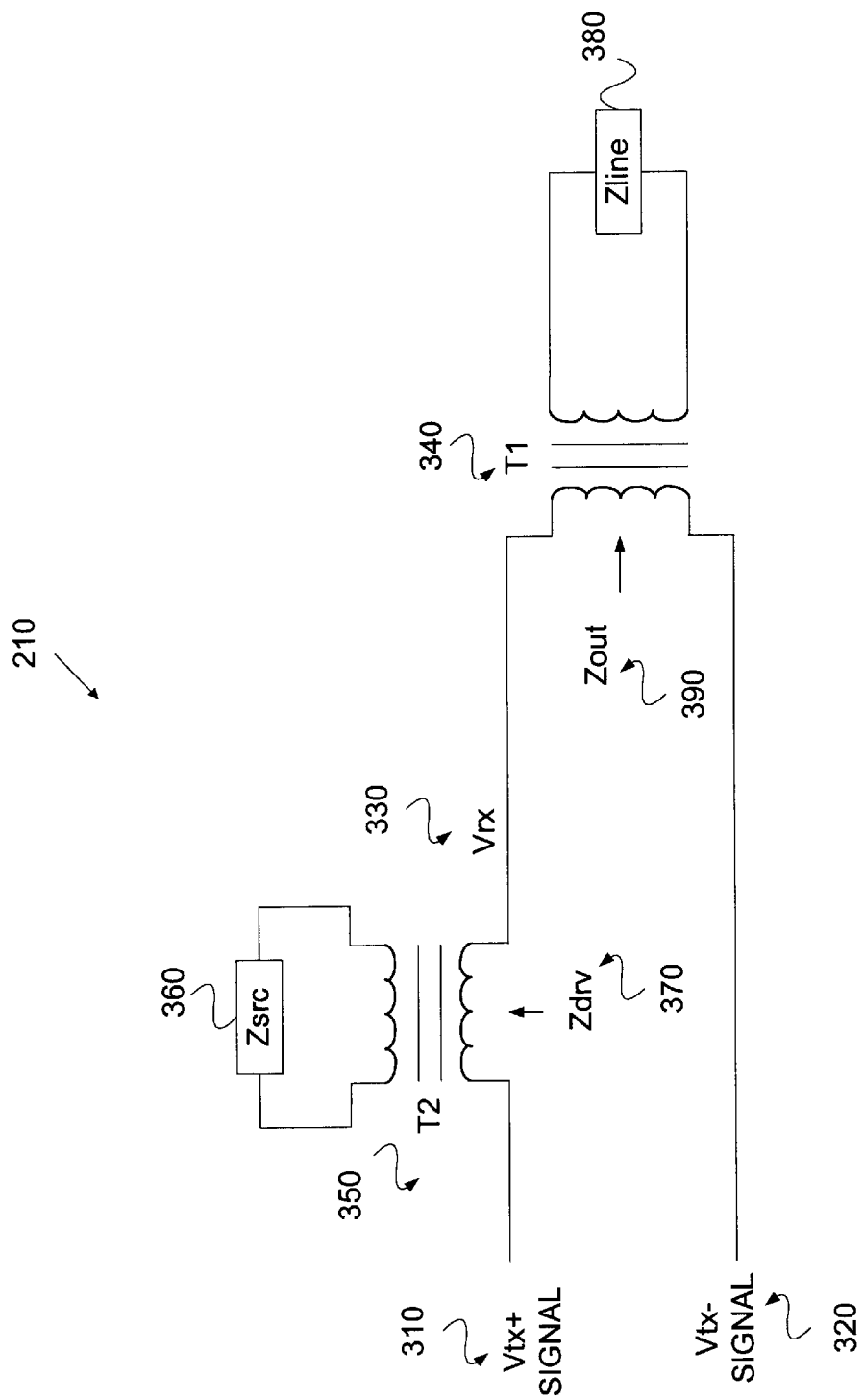
FIG. 3 is a diagram of one embodiment of a circuit including a hybrid with transformer-coupled matching impedance in accordance with the invention.

FIG. 3 is a diagram of one embodiment of a circuit including hybrid 210 (FIG. 2) in accordance with the invention. All node voltages discussed in FIG. 3 are with respect to ground. A Vtx+ 310 transmit signal and a Vtx− 320 transmit signal are complimentary differential signals produced by other xDSL circuitry 220. A Vrx signal 330 is a non-differential receive signal. Trans-hybrid loss is defined as Vrx 330 with respect to Vtx when there is no signal being received by hybrid 210 from line 142.

The circuit of FIG. 3 shows impedance values Zsrc 360, Zdrv 370, Zout 390, and Zline 380. Zline 380 represents the impedance of line 142 as seen by a T1 transformer 340, which is coupled to line 142. Zout 390, seen at the other side of T1 transformer 340, represents Zline 380 in combination with the impedance of T1 transformer 340. Zsrc 360 represents the impedance of a complex impedance network (source impedance) coupled to a T2 transformer 350. Zsrc 360 is designed and built to be substantially equal to Zline 380. Zdrv 370, seen at the opposite side of T2 transformer 350, represents Zsrc 360 in combination with the impedance of T2 transformer 350.

T1 transformer 340 and T2 transformer 350 are substantially identical. Substantially identical transformers can be achieved by producing the transformers using the same manufacturing process at the same manufacturing facility. Substantially identical T1 transformer 340 and T2 transformer 350 have substantially identical impedances, including substantially identical leakage inductances and substantially identical magnetizing inductances. By coupling Zsrc 360 into hybrid 210 using T2 transformer 350 instead of directly coupling Zsrc 360 in series with T1 transformer 340, there is no need to modify Zsrc 360 with discreet inductors to match intrinsic inductances of T1 transformer 340. Typically, it is difficult to manufacture inductors and other circuit elements to match intrinsic inductances present in T1 transformer 340. By coupling Zsrc 360 using T2 transformer 350, which is substantially identical to T1 transformer 340, Zdrv 370 and Zout 390 are substantially identical.

If T1 transformer 340 and T2 transformer 350 are non-ideal but identical, and if Zsrc 360 equals Zline 380, then Zdrv 370 would equal Zout 390 and hybrid 210 would provide a perfect voltage divider resulting in ideal trans-hybrid loss. This perfect voltage divider permits the transformers to have significant leakage and magnetizing inductances without compromising hybrid 210 performance. By utilizing substantially identical T1 transformer 340 and T2 transformer 350, and utilizing Zsrc 360 that is substantially equal to Zline 380, Zdrv 370 is substantially equal to Zout 390 and an almost perfect voltage divider can be achieved in hybrid 210 that provides effective noise cancellation between transmit and receive signals.

Figure 4:
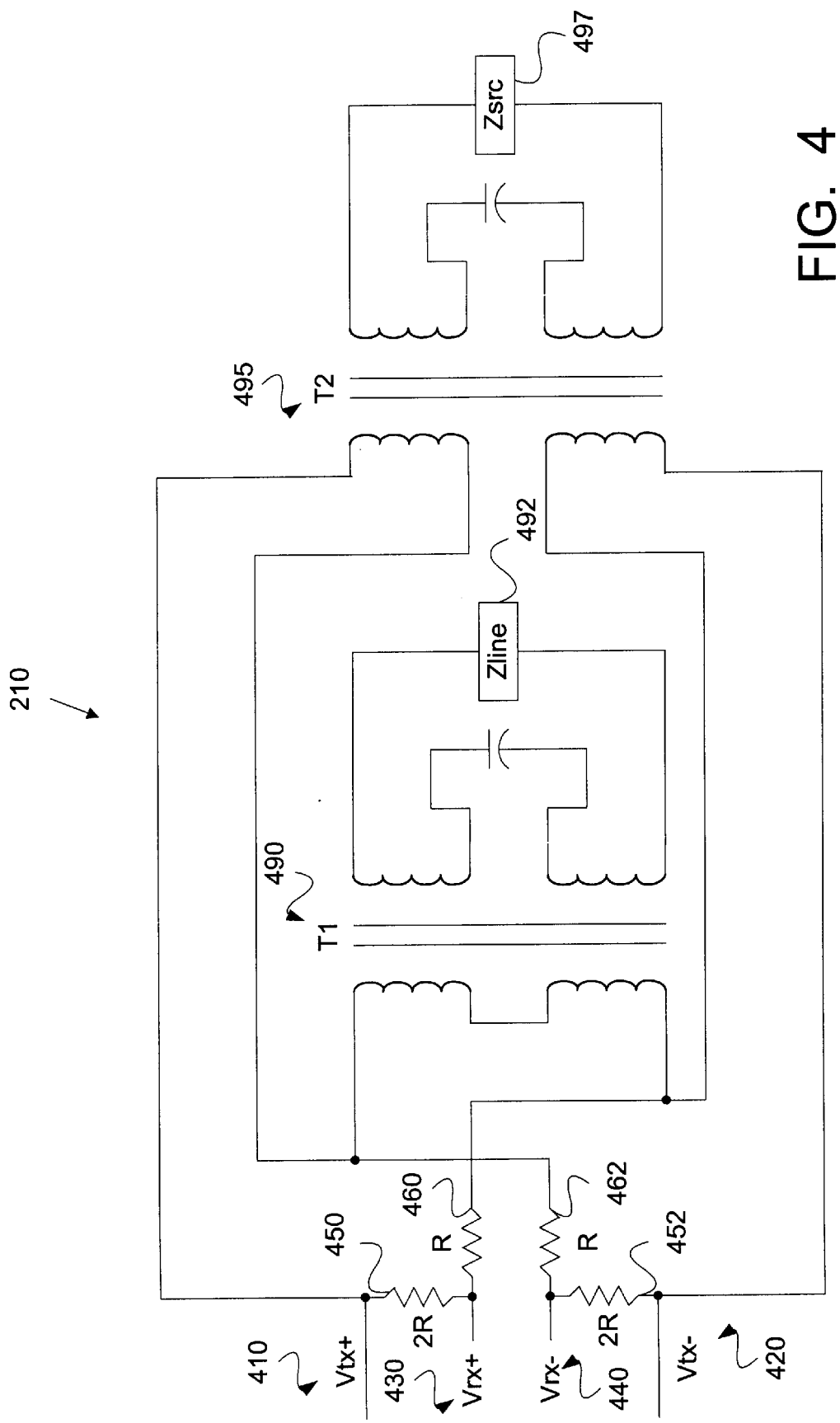
FIG. 4 is a diagram of another embodiment of a circuit including a hybrid with transformer-coupled matching impedance in accordance with the invention.

FIG. 4 is a diagram of another embodiment of a circuit including hybrid 210 in accordance with the invention. Specifically, FIG. 4 shows hybrid 210 with a differential transmit signal (Vtx+ 410 and Vtx− 420) and a differential receive signal (Vrx+ 430 and Vrx− 440). In order to cancel the transmit signal in the receive path while maintaining a fully differential receive signal, the receive path includes voltage divider networks. In FIG. 4, a resistor 450 with a value of 2R and a resistor 460 with a value of R operate in conjunction as an R-2R voltage divider network for passive hybrid cancellation. A resistor 452 and a resistor 462 also operate in conjunction as an R-2R voltage divider network. Alternately, for active hybrid cancellation, hybrid 210 can include an operational amplifier circuit (not shown) with similar resistor ratios. Typically, R is much greater than a Zline 492 so as to cause negligible loading effects, where Zline 492 represents the impedance of line 142 (FIG. 1).

Further, a T1 transformer 490 and a T2 transformer 495 have split windings with a winding ratio of 1:1:1:1. T1 transformer 490 and T2 transformer 495 are substantially identical, and a Zsrc 497 represents a complex impedance network with an impedance that is substantially equal to Zline 492. By using split winding T2 transformer 495, a single instance of Zsrc 497 operates as two equal impedances, each with a value of ½ Zsrc, that are isolated from one another. The FIG. 4 embodiment advantageously requires only one matching impedance network, Zsrc 497, rather than two distinct matching impedance networks each having a value of ½ Zsrc as required by prior art embodiments that utilize a split winding line coupling transformer.

Other variations on the circuit topologies previously described are compatible with the transformer-coupled matching impedance of the invention. Exemplary circuit topologies include circuits with single ended or differential transmit or receive paths, circuits with single or split source impedance, circuits with transformer winding ratios other than 1:1, and circuits with a split winding transformer such that the line-side is wired in series while the driven side is wired in parallel.

Figure 5:
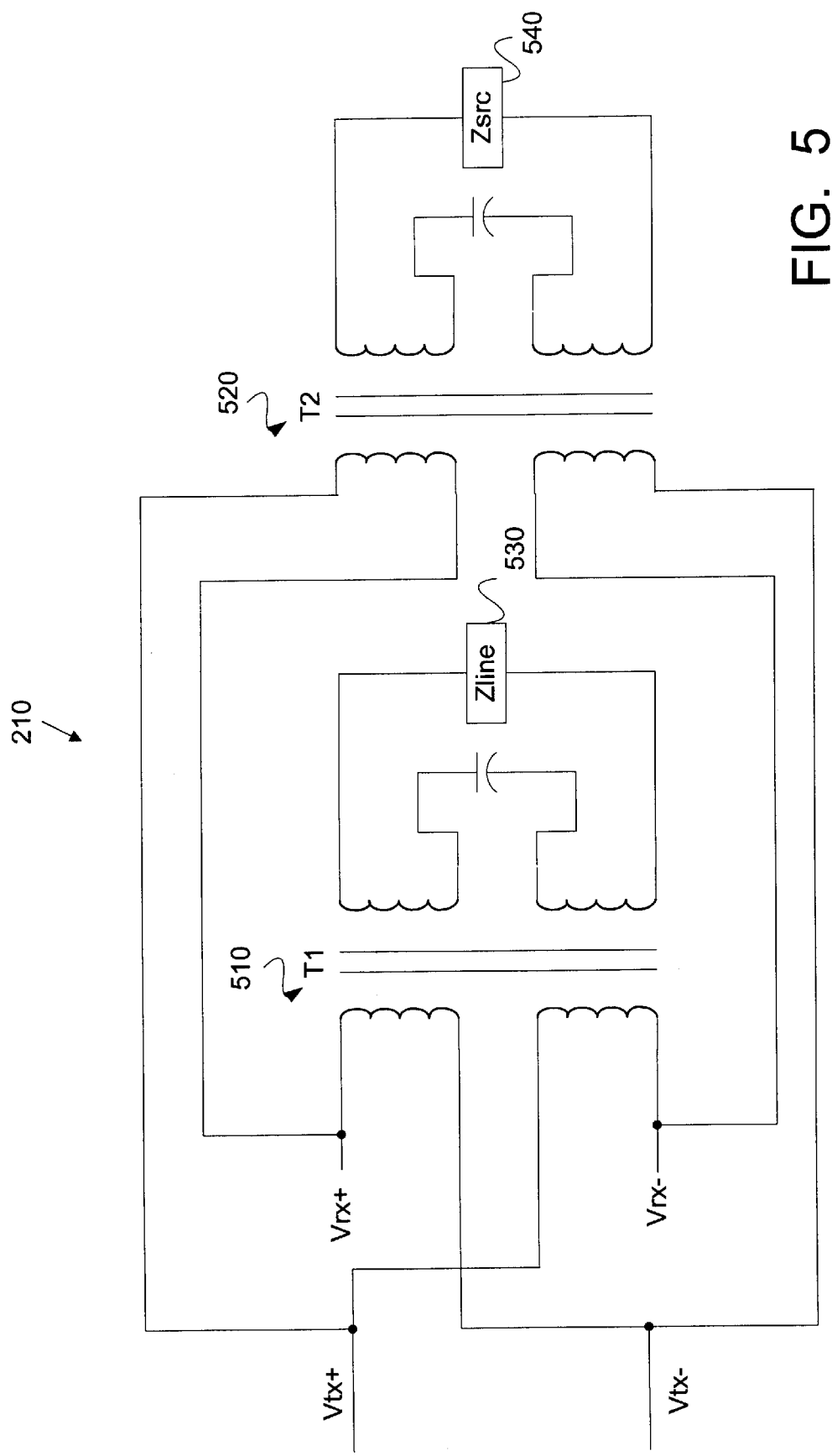
FIG. 5 is a diagram of another embodiment of a circuit including a hybrid with transformer-coupled matching impedance in accordance with the invention.

FIG. 5 is a diagram of another embodiment of a circuit including hybrid 210 (FIG. 2) in accordance with the invention. In the FIG. 5 embodiment, the line side of a T1 transformer 510 is wired in series and the driven side of T1 transformer 510 is wired in parallel, which is an efficient way of driving line 142. A T2 transformer 520 is substantially identical to T1 transformer 510 and a Zsrc 540 is substantially equal to a Zline 530, which represents the impedance of line 142 (FIG. 1). Similar to the previous embodiments, matching impedance Zsrc 540 coupled to the hybrid 210 circuit via T2 transformer 520 improves noise cancellation between the transmit and receive signals.

In addition to improving hybrid noise cancellation, another advantage of implementing transformer-coupled matching impedance in hybrid 210 involves linearity. All transformers are less than ideal in terms of linear parasitics, such as unwanted capacitance and unwanted inductance. Further, transformers are less than linear devices because of the magnetic properties of the materials used in making the transformers. Thus, all transformers will introduce some distortion. Typically, transformers used in xDSL applications, such as xDSL device 140, must have low distortion. Otherwise, the non-linear transfer function modulates the signals passing through the transformer. This modulation causes harmonic distortion and creates intermodulation products, which appear as noise, and degrade performance of the xDSL system.

In the FIG. 3 embodiment for example, T2 transformer 350 is substantially identical to T1 transformer 340, and thus both transformers will have substantially the same non-linear effects. Since Zsrc 360 is substantially equal to Zline 380, Zdrv 370 is substantially equal to Zout 390, in spite of the non-linear effects of T2 transformer 350 and T1 transformer 340.

Another advantage occurs in embodiments where xDSL device 140 is designed for optimal hybrid matching to more than one reference line impedance. Implementing such an embodiment requires incorporating relays or other switching elements in hybrid 210 to select among alternate matching impedance networks to find the best match to a current line impedance. In the most common topology of prior art hybrids having differential transmit and differential receive paths, there are typically two impedance networks each equal to one half the value of the impedance needed to match the line impedance. Both of the two impedance networks will need to be switched to match different line impedance values. Such a hybrid requires two instances of the switching relay in addition to the two matching impedance networks.

However, an embodiment of hybrid 210 in accordance with the invention having differential transmit and receive paths requires only one matching impedance network, since a second split winding transformer, for example T2 transformer 495 of FIG. 4, allows a single instance of a matching impedance network, for example Zsrc 497, to be used. Thus an embodiment of hybrid 210 having differential transmit and receive paths configured to include multiple matching impedance networks only requires one switching network to select among the multiple matching impedance networks, which results in significant cost and space savings.

The invention has been explained above with reference to specific embodiments. Other embodiments will be apparent to those skilled in the art in light of this disclosure. The present invention may readily be implemented using configurations other than those described in the embodiments above. Additionally, the present invention may effectively be used in conjunction with systems other than the one described above. Therefore, these and other variations upon the above embodiments are intended to be covered by the present invention, which is limited only by the appended claims.

What is claimed is:

1. A hybrid comprising:
    a first split winding transformer configured to couple to a line, the line having a line impedance; and
    a second split winding transformer coupled in series with the first transformer, the second transformer configured to couple a source impedance, the source impedance being substantially equal to the line impedance, the first transformer and the second transformer being substantially identical, wherein the first transformer is serially coupled to a line interface circuit and the second transformer is parallel coupled to the line interface circuit.

2. The hybrid of claim 1, wherein the first transformer and the second transformer have substantially equal leakage inductances and substantially equal magnetizing inductances.

3. The hybrid of claim 1, wherein the first transformer has a winding ratio of 1:1 and the second transformer has a winding ratio of 1:1.

4. The hybrid of claim 1, wherein the first transformer is a spilt winding transformer and the second transformer is a spilt winding transformer.

5. The hybrid of claim 4, wherein each split winding transformer has a winding ratio of 1:1:1:1.

6. The hybrid of claim 1, wherein the line is a twisted-pair copper wire.

7. The hybrid of claim 1, wherein the line is configured to carry DSL signals.

8. The hybrid of claim 1, wherein the source impedance is a complex impedance network.

9. The hybrid of claim 1, further comprising a plurality of source impedances and a switching network configured to couple at least one of the plurality of source impedances to the second transformer.

10. The hybrid of claim 9, wherein each of the plurality of source impedances is substantially identical to one of a plurality of line impedances.

11. A line interface circuit comprising:
    a line coupling transformer configured to couple to a line, the line having a line impedance;
    a matching impedance configured to be substantially identical to the line impedance; and
    a transformer configured to couple the matching impedance to the line interface circuit,
        the transformer being substantially identical to the line coupling transformer,
        wherein the line coupling transformer is serially coupled to the line interface circuit and the transformer is parallel coupled to the line interface circuit and both transformers are split winding transformers.

12. The line interface circuit of claim 11, wherein the line coupling transformer and the transformer have substantially equal leakage inductances and substantially equal magnetizing inductances.

13. The line interface circuit of claim 11, wherein the line coupling transformer has a winding ratio of 1:1 and the transformer has a winding ratio of 1:1.

14. The line interface circuit of claim 11, wherein the line is configured to carry DSL signals.

15. The line interface circuit of claim 11, wherein each split winding transformer has a winding ratio of 1:1:1:1.

16. The line interface circuit of claim 11, wherein the matching impedance is a complex impedance network.

17. The line interface circuit of claim 11, wherein the line is a twisted-pair copper wire.

18. The line interface circuit of claim 11, further comprising a plurality of matching impedances and a switching network configured to couple at least one of the plurality of matching impedances to the transformer.

19. The line interface circuit of claim 18, wherein each of the plurality of matching impedances is substantially identical to one of a plurality of line impedances.

* * * * *